United States Patent [19]

Picard

[11] Patent Number: 4,942,572
[45] Date of Patent: Jul. 17, 1990

[54] PROCESS AND DEVICE FOR HIGH SPEED POLLING

[75] Inventor: Jean-Louis Picard, La Colle sur Loup, France

[73] Assignee: International Business Machines Corporation, Armonk, N.Y.

[21] Appl. No.: 372,146

[22] Filed: Jun. 26, 1989

Related U.S. Application Data

[63] Continuation of Ser. No. 139,406, Dec. 29, 1987, abandoned.

[30] Foreign Application Priority Data

Dec. 30, 1986 [FR] France ............................ 86430055

[51] Int. Cl.$^5$ ............................................ H04J 3/24
[52] U.S. Cl. ............................ 370/85.8; 340/825.08
[58] Field of Search ..................... 370/84, 85.2, 85.8, 370/95.2; 340/825.08

[56] References Cited

U.S. PATENT DOCUMENTS

| | | | |
|---|---|---|---|
| 3,755,781 | 8/1973 | Haas et al. | 340/825.08 |
| 3,755,782 | 8/1973 | Haas et al. | 340/825.08 |
| 4,000,378 | 12/1976 | Caplan | 370/90 |
| 4,340,961 | 7/1982 | Capel et al. | 370/96 |
| 4,638,313 | 1/1987 | Sherwood, Jr. et al. | 340/825.08 |
| 4,667,193 | 5/1987 | Cotie et al. | 340/825.08 |
| 4,742,335 | 5/1988 | Vogt | 340/825.06 |

Primary Examiner—Douglas W. Olms
Assistant Examiner—Melvin Marcelo
Attorney, Agent, or Firm—Edward H. Duffield

[57] ABSTRACT

A process is disclosed for efficiently polling low rate data terminals attached to communicate with a central station via a high speed channel. The process is based on the use of a dual rate polling mechanism involving first polling by using a high rate pseudo random sequence; monitoring the messages received back from the terminals; checking said messages for validity, and upon detecting an invalid message possibly indicating collision between terminal messages, then switching back into the first generated sequence at a lower conventional rate.

3 Claims, 9 Drawing Sheets

PROCESS AND DEVICE FOR HIGH SPEED POLLING

This is a continuation of Ser. No. 07/139,406, filed 12/29/87, abandoned.

FIELD OF THE INVENTION

This invention deals with improvements to data communications and more particularly with data communications based on polling techniques.

BACKGROUND OF THE INVENTION

In data transmission networks, supervision functions are provided to ensure integrity of data transfers. For instance, in a network including a Control Station to which a number of data terminals are attached, the transmission from any terminal to the Control station may be organized using a polling technique. This technique may be implemented through the cyclic scanning of a list of terminal addresses.

At each polling cycle data are effectively transferred only when the terminal involved is polled and the polled terminal wishes to transmit at that very instant.

This, obviously is time consuming since at each polling cycle, time is devoted to polling terminals which do not wish to transmit. The greater the number of terminals attached to the network, the higher the time consumed... This process is more particularly inefficient when the attached terminals are low traffic rate terminals attached to the network through a high speed (HS) channel.

SUMMARY OF THE INVENTION

The present invention is made to provide a very efficient polling mechanism more particularly suited for a network wherein a great number of low traffic terminals are connected to a central station e.g. a Communication Controller. The improvement is based on high speed polling mechanisms judiciously combining a first (e.g. pseudo random) polling sequence generated at a first high rate,(e.g. bit rate) with a second polling sequence at a lower rate.

This and other objects of the invention will become more apparent from the following description made with reference to the accompanying drawings.

DESCRIPTION OF THE PREFERRED EMBODIMENT

Figure 1:
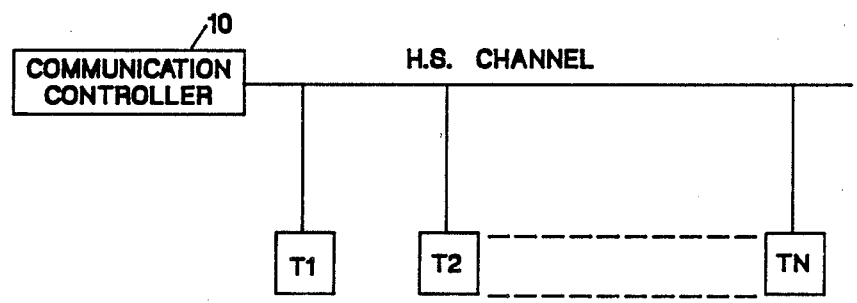
FIG. 1 : is made to illustrate a network wherein the invention can be used.

FIG. 1 represents a multidrop communication network. It includes a Communication Controller 10 to which a great number (N) of terminals (T1 T2, ... TN) are attached through a communication link like, for instance , an RF channel, a High Speed (HS) Bus, or a communication line. As will be mentioned further, modems are provided at both ends of the network, i.e. at each terminal location and at the Communication Controller site.

This situation can be encountered in networks using a CATV available channel as a transmission facility between Personal Computer (PC) oriented terminals and a Host Processor. In such an environment a conventional polling scheme may become very inefficient since the polling may be too slow and involve very few productive polling cycles.

The present invention, as will be illustrated further, provides significant performance improvement brought by an auto poll control logic which will be added to the conventional hardware.

Though it is assumed in this description that protocols between the Communication Controller and the Terminals are bit oriented, the present invention can also be adapted to character or byte oriented protocols. Reference is made to SDLC throughout this description, but HDLC could have been referred to as well.

When the Communication Controller has no message to send to the terminals, it broadcasts a specific pattern announcing a subsequent polling procedure. Such a message may include a flag (e.g. SDLC hexadecimal 7E flag) followed by a predetermined number "n" of zero bits. Assuming no terminal is assigned an all zero address, this pattern will never occur elsewhere in the data flow and thus by being monitored by all the terminals it will be detected as a "start Auto-Poll" message announcing subsequent polling. Those terminals having a message pending are thereby invited to respond at the next opportunity, that is when polled.

The Communication Controller then switches control logic to the communication interface (not shown) and starts generating a pseudo-random, so called Auto-Poll or simply Poll Sequence, at bit rate. In other words, at each new bit generated by the interface, a new terminal address is provided for polling purposes.

As soon as a terminal recognizes its address during an error free period, it is given permission to transmit a pending response, e.g. an available SDLC frame. During this auto-poll transmission period, the Communication Controller is made to monitor input from the terminals. Then, when an input signal is sensed by the Controller, the auto-poll sequence is halted by a bit violation in this sequence followed by an SDLC idle pattern having a number of bits greater than the number of ones which can be found in the auto-poll sequence. This will inhibit further attempts by the terminals to respond to auto-poll.

The Controller will then check the received message validity. Several methods may be used to perform this checking. Assuming the transmission uses SDLC (or HDLC) techniques, then the received message is frame formatted and includes a so called Frame Checking Sequence (FCS) field, the contents of which is to be used to that very goal of checking the validity of received frame.

Based on the result of this checking, either of two situations may then occur. Either a correct (valid) message is received, which will correspond to the case where only one terminal responded to the auto-poll sequence for which the Communication Controller processes then the response; or the received message was invalid. The Controller will then assume that a collision occurred due to more than one terminal, whose addresses are close to each other in the pseudo-random polling (auto-poll) sequence, responding to the auto-poll sequence. The Controller will then go back in the polled pseudo random sequence and start conventional SDLC polling frames. The polling is thus made then at a lower rate, but on a limited and lower number of terminal addresses.

Once the communication from terminal to Controller ends, the Communication Controller may resume auto-poll by sending a new start auto-poll pattern followed by the auto-poll sequence, as previously explained.

Using such a technique may lower to 0.5 microseconds the time interval between polling of two station operating on a 2 Mbps link.

Figure 2:
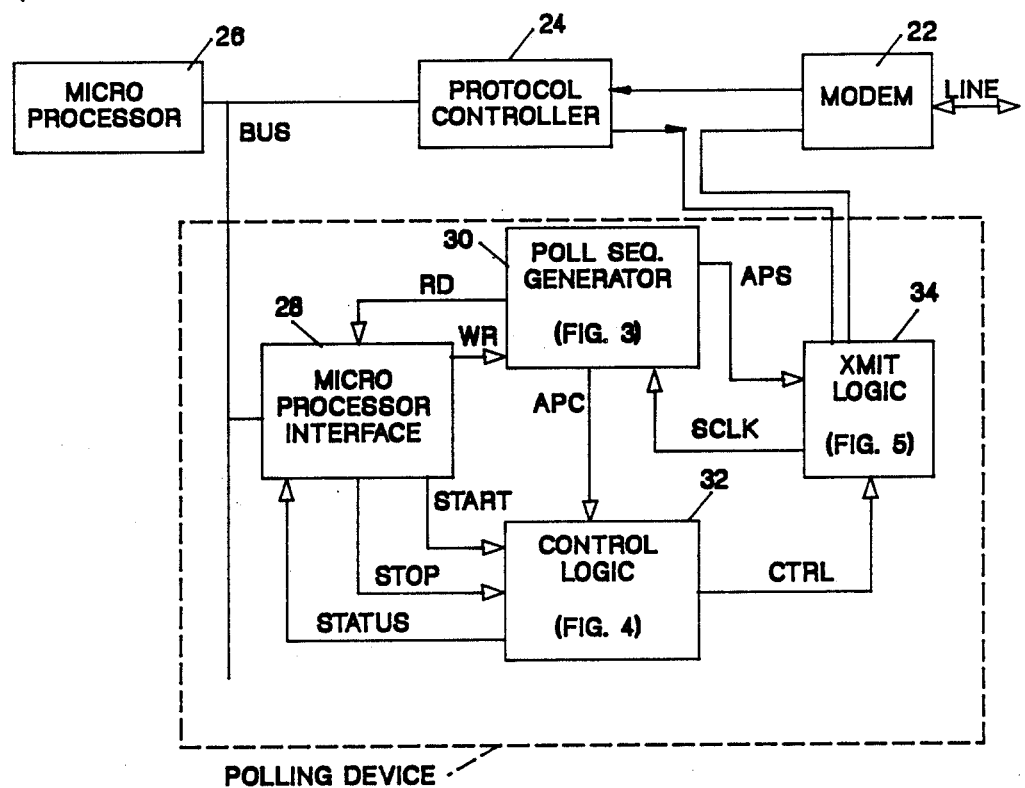
FIG. 2 : illustrates the polling device of this invention at the Communication Controller location.
Figure 6:
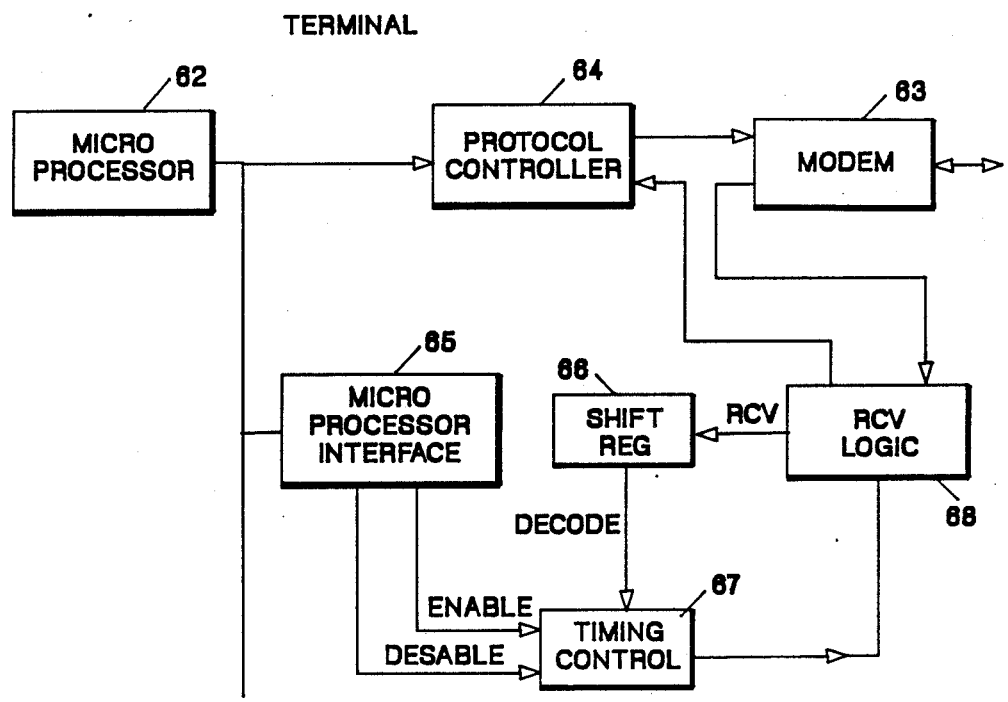
FIG. 6 : illustrates the polling device at the terminal location.

Diagrams from the Communication Controller and from a terminal are represented in FIGS. 2 and 6 respectivelly, with attached modems for performing the conventional ventional line interfacing operations. The embodiment to be described hereunder assumes that the terminals are identified by two-byte addresses which, assuming normal addressing conventions where all zero and all one addresses are not assigned, enables the connection of up to 65,534 terminals to a system to be polled by this invention.

FIG. 2 represents, in addition to the polling devices made to implement the invention, only those circuits belonging to the Communication Controller and interfacing with the invention. FIG. 2 includes a modem 22 connected to the transmission line, (HS Channel). When operating in the transmission mode for transmitting from the Communication Controller to the terminals (not shown, see FIG. 1), bits provided to the modem 22 by the Controller are conventionally converted into a signal the frequency spectrum of which fits to the transmission line bandwidth. Conversely, in reception mode, the signal received over the transmission line is processed by modem 22 to derive therefrom the bits provided by the terminals (not shown). The modem is thus basically a transparent device as far as this invention is concerned and any type of available modem could be used. The modem is connected to a protocol controller 24 converting incoming bits into characters and characters into outgoing bits, organizing their transfer to and from a storage contained in microprocessor 26, and checking or generating the FCS present in each frame of characters.Some protocol controllers, also referred to as communication coprocessor, are capable of operating at 2 Mbps or higher, as does, for example the Intel 82586. The microprocessor represents the Communication Controller intelligent part, it will conventionally control transmission and reception operations, assemble the received frames into a message, check its validity, interpret it and take action accordingly. These operations are conventional ones and thus need no further developments here.

The microprocessor is provided with a bus and attached to this bus are the protocol controller and the polling device of this invention. The polling device includes a microprocessor interface 28, a polling sequence generator 30, a timing control (Ctrl) logic 32 and a transmit (Xmit) logic device 34.

The microprocessor interface attached to the microprocessor bus is mainly a decoder assigned addresses enabling the microprocessor to start and to stop the auto poll mechanism, to read (Rd) the address contained in the Poll Sequence generator,or to load it (Wr) with a defined code. Start and stop auto poll controlled by the microprocessor, enable circuit 28, thereby providing START and STOP commands toward the Timing Control Logic 32. The Microprocessor Interface circuit could also read the Timing control circuit (32) status. The Transmit Logic 34 is merely a switch made to feed the modem input with bits coming either from protocol controller 24, or from Polling Sequence Generator 30 and thus send the polling sequence over the transmission line and to the terminals. The control of the switch 34 is left to circuit 32 providing control (Ctrl) signals.

The Microprocessor Interface circuit 28 is a decoder converting coded orders from the microprocessor 26 to raise the logic level of one of the lines connecting it to circuits 30 and 32.

Figure 3:
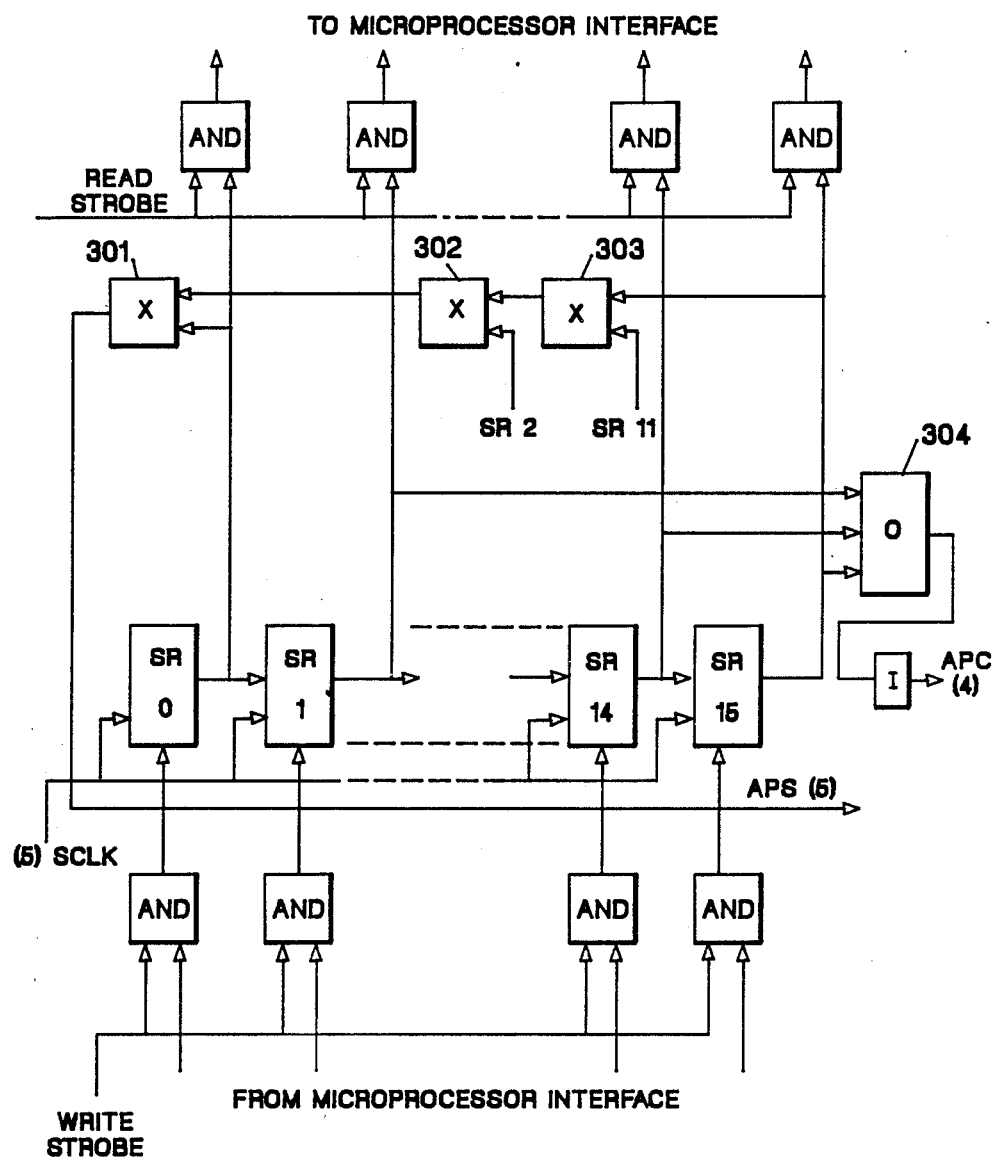
FIGS. 3 - 5 : are circuits for implementing the functions illustrated in FIG. 2.

The Poll Sequence Generator 30 represented in FIG. 3 includes a 16-stage shift register made of flip-flops SR 0 through SR 15, with a feedback loop made through XOR gates X 301, X 302 and X 303. The auto poll sequence APS is available at the output of said XOR gate X 301 as a pseudo random sequence, with a period depending on the polynomial reflected bythe feedback connections, which in the present embodiment is $$G(x) = x^{}16 + x^{}12 + x^{**}3 + x + 1$$

with the symbol ** standing for "to the power".

As this polynomial is primitive,the Auto-Poll Sequence (APS) generated has a periodicity of 65,535. During a complete cycle, all 16 bit codes except All zero are generated once and only once, allowing thereby to poll all the addresses used. Once per cyclethe signal Auto Poll Cycle (APC) is present. It corresponds to the occurrence of a sequence of 15 adjacent zeros in the shift register, provided through an OR gate 0 304 and an inverter (I). A counter 410 in FIG. 4 will be incremented with these APC signals to enable the microprocessor to keep track of the polling cycles.

In FIG. 3, two sets of AND gates are also provided to enable forcing an initial value from the microprocessor interface into the shift register SR0–SR15 or reading the shift register contents into the microprocessor interface. Write strobe and Read strobe orders are made available through the Wr and Rd connections, respectively. An SCLK clock signal to be defined further (see FIG. 5), is used to control the shifting operations within the shift register SR0–SR15. One should also note that in the Figures numeral references between parenthesis are used which designate another Figure. For instance, in FIG. 3, (5) SCLK means SCLK signal of FIG. 5.

Figure 4:
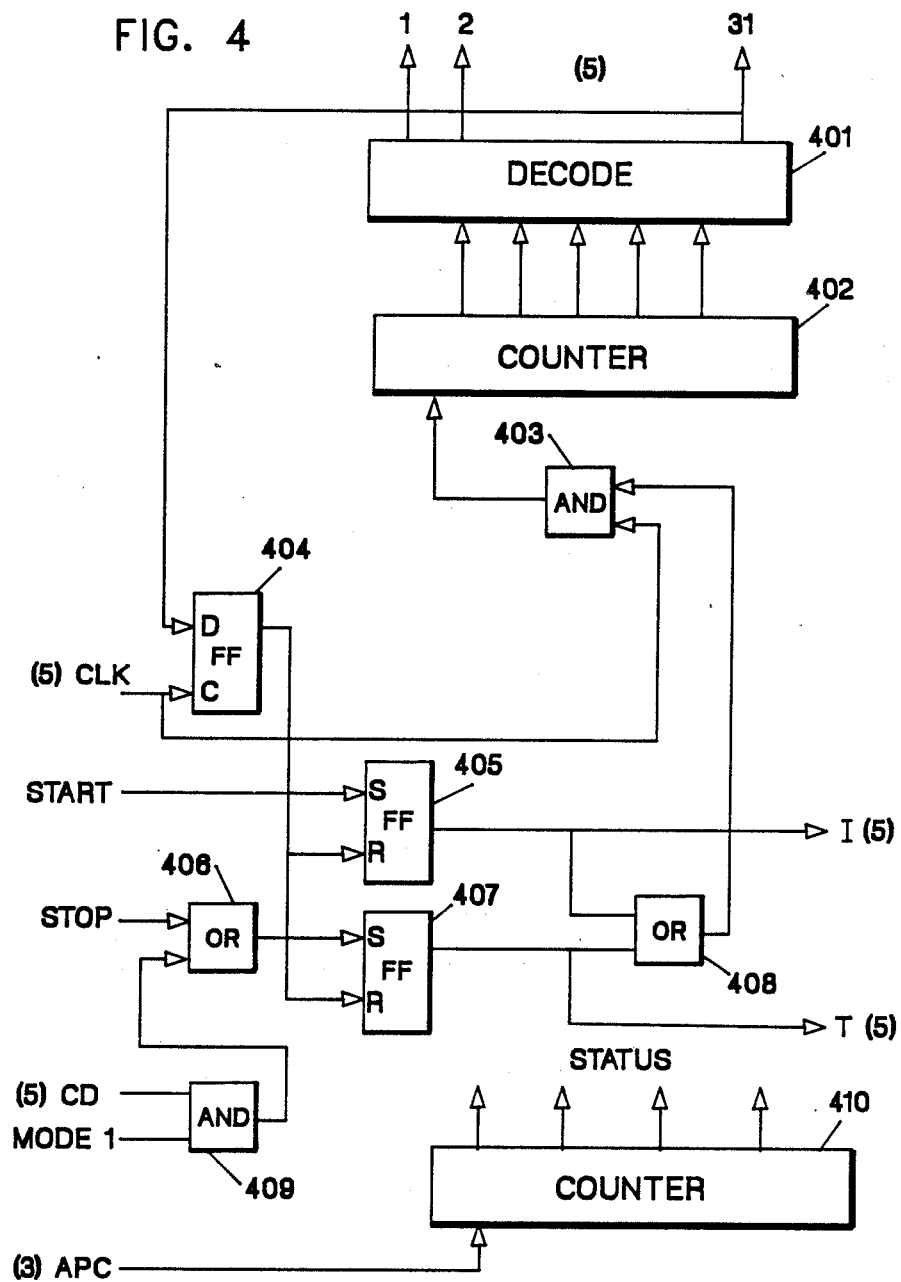

Represented in FIG. 4 is the Timing Control Logic device (32 in FIG. 2). This device is made to generate timing signals by means of a five-stage counter 402 which runs through a complete cycle, that is 32 clock intervals whenever it is started. This is accomplished by means of two flip flops FF 405 and FF 407. When either one is set, the output of OR gate 408 lets CLK clock pulses run the five bit counter 402, through AND gate 403 until the decode of state 31 made by decoder 401 causes, at the next clock cycle, a reset of flip flop 405 or flip flop 407, through flip flop FF 404. Stop operation is provided through OR gate 0 406, to set FF 407. CD and Mode 1 data to be defined further are also provided to 0 406 through AND gate A 409. I and T signals provided by FF 405 and FF 407 respectively will be defined later on as will be the counter 410 represented in FIG. 4.

Figure 5:
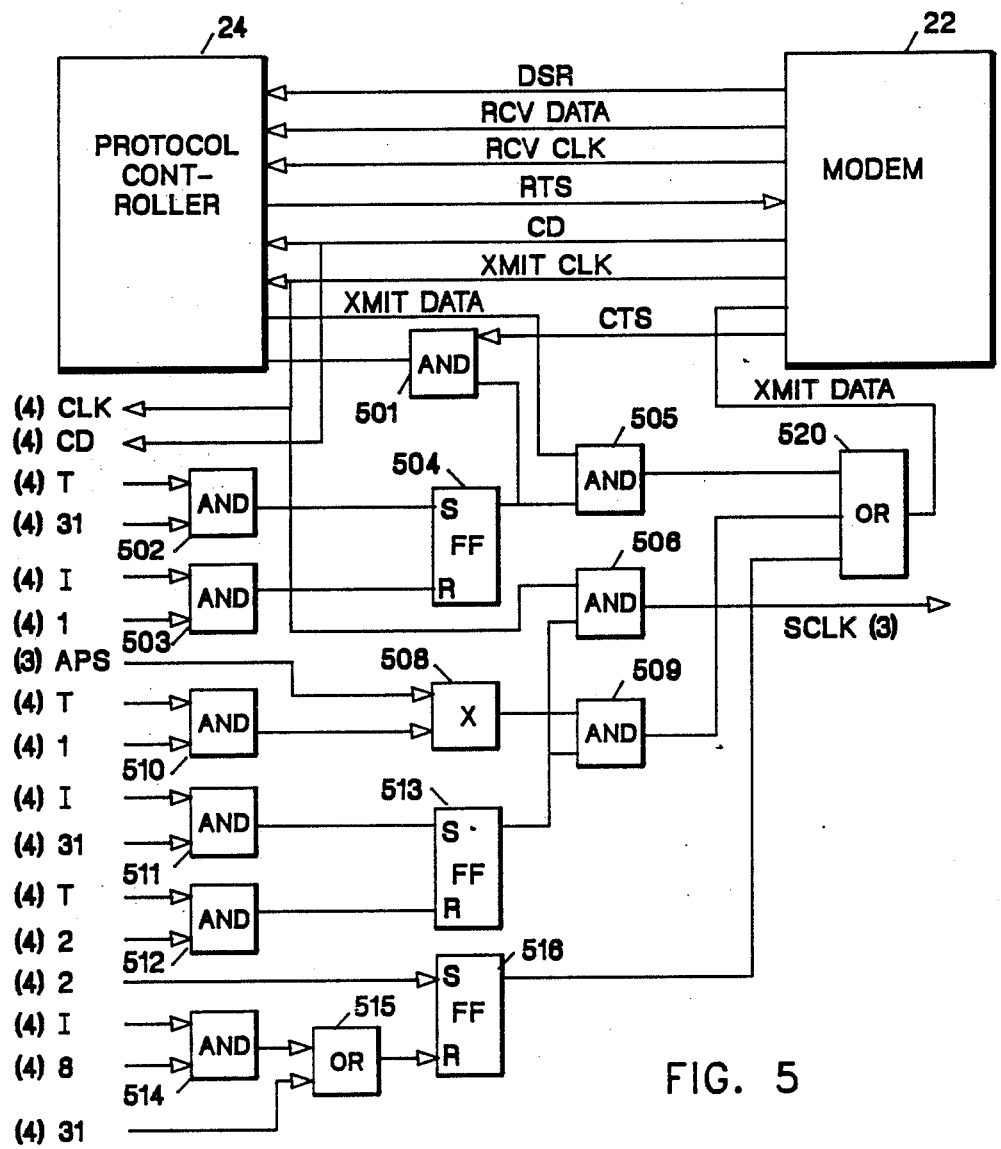

Represented in FIG. 5 is the transmit logic circuit 34 of FIG. 2 or in other words the switch made to enable connecting the modem input either to the protocol controller 24 for conventional transmission from the Communication Controller to the modem, or to the polling device of this invention.

The interfacing connections between the Communications Controller circuit 24 and the modem is made according to the CCITT Recommendation V.24 / EIA Standard RS 232 with the connecting lines identified accordingly and with the following definitions:

| | |
|---|---|
| DSR = | Data Set Ready |
| RCV DATA = | Receive Data |
| RCV CLK = | Receive Clock |
| RTS = | Request to Send |
| CD = | Carrier Detector |
| XMIT CLK = | Transmit Clock |
| CTS = | Clear to Send |
| XMIT DATA = | Transmit Data |

The master clocking signal is provided by the modem internal clock, and used to generate the CLK signal referred to in FIG. 4.

The CTS line is connected to protocol controller 24 through AND gate A 501. The inputs of a set of AND gates A 502, A 503, A 510, A 511, A 512, and A 514 are connected to respective outputs of the timing control circuit of FIG. 4, with (I) and (T) being respectively provided by the outputs of flip flops FF 405 and FF 407, and numbers 1 through 31 representing the corresponding outputs of DECODE circuit 401. The outputs of AND gates A 502 and A 503 are respectively used to set and to reset a flip flop FF 504 the output of which is used as second input to AND gate A 501 and as one input of an AND gate A 505 the second input of which is connected to the Protocol Controller Transmit Data lead. The Xmit Clk lead is connected to one input of an AND gate A 506 the second input of which is connected to the output of a flip flop FF 513. The set and the reset inputs to FF 513 are respectively provided by the outputs of A 511 and A 512. The output of FF 513 is also connected to one input of an AND gate A 509 the second input of which is provided by a XOR gate X 508 the inputs of which are provided by APS signal from FIG. 3 and by the output of gate A 510. The Xmit Clk signal also designated by CLK is ANDed into gate A 506 with the output of FF 513 to provide the clock signal designated by SCLK controlling the shift register of FIG. 3. The output 31 of DECODE 401 of FIG. 4 is ORed in 0 515 with the output of gate A 514 to reset a flip flop FF 516 the Set input of which is provided by output 2 of DECODE 401. The outputs of gates A 505 and A 509 are ORed in 0 520 with the output of FF 516 to provide the Xmit Data input to the modem.

In operation, Start and Stop Auto Poll commands provided by microprocessor 26 cause the Microprocessor Interface to generate Start and Stop signals toward the Timing Control Logic (FIG. 4), which in both cases generates timing signals by means of counter 402. As already mentioned said counter runs through a complete cycle whenever it is started.

When a Start signal occurs the timing signals generated by counter 402 cause the logic of FIG. 5 to perform the following operations:

stop transmitting bits from the Communication Controller through the protocol controller (24) (see FIG. 5), FF 504 being reset at the beginning of the initialization phase;

generate an HDLC Flag followed by 24 zero valued bits by means of FF 516;

let the clock run the Poll Sequence Generator (30), transmit the sequence of bits (APS) generated to the modem, by means of FF 513, letting the receive clock go through AND gate 506 toward the Poll Sequence Generator, and through AND gate 509 letting APS signals be fed into the modem.

When a Stop signal occurs the timing signals cause the Xmit logic of switch 34 to perform the following operations:

violate the Poll Sequence, by means of XOR gate 508;

generate an idle pattern of 30 one valued bits, by means of FF 516;

transmit bits from the protocol controller 24, by setting FF 504.

The same sequence of events also occurs if Mode I signal is ON on gate 409, when carrier detect CD becomes present, corresponding to the situation when a terminal is transmitting a response.

In case of contention, i.e. incorrect FCS checked on data received back by the Communication Controller (RCV DATA), the microprocessor reads then the address contained in the Poll Sequence Generator (30), computes the address it contained D clock times before it stopped ( D depending on the maximum round trip transmission delay between the Communication Controller and the terminals), and uses the computed address to send a series of SDLC/HDLC conventional polling commands to resolve the contention. In other words this new polling sequence polls again the D terminals just polled by the system before contention being detected by the Communication Controller, but at a lower rate.

Represented in FIG. 6 is a block diagram of one of the terminals T1 through TN of FIG. 1, i.e. one of the terminals to be polled by the system of this invention.

Basically, the architecture resembles the architecture of the polling section pertaining to the Communication Controller. It includes a microprocessor 62 representing the intelligent section of the device, a modem 63 for interfacing with the transmission line, and, in between, a protocol controller 64. These are only conventional elements independent of this invention. Attached to the microprocessor Bus is a microprocessor interface 65, through which the microprocessor orders (Enable/Disable) are conveyed to the device of this invention. The polling of the terminal also includes: a shift register 66 (FIG. 7); a timing control 67 (FIG. 8), and receive (RCV) logic 68 (FIG. 9). The microprocessor interface 65 is basically a decoder made to decode the orders provided by microprocessor 62. The receive logic 68 is essentially a switch made to deliver the bits received by the modem 63, to the microprocessor through the protocol controller 64, only when they are destined to the microprocessor, that is out of an auto poll (polling) sequence.

Figure 7:
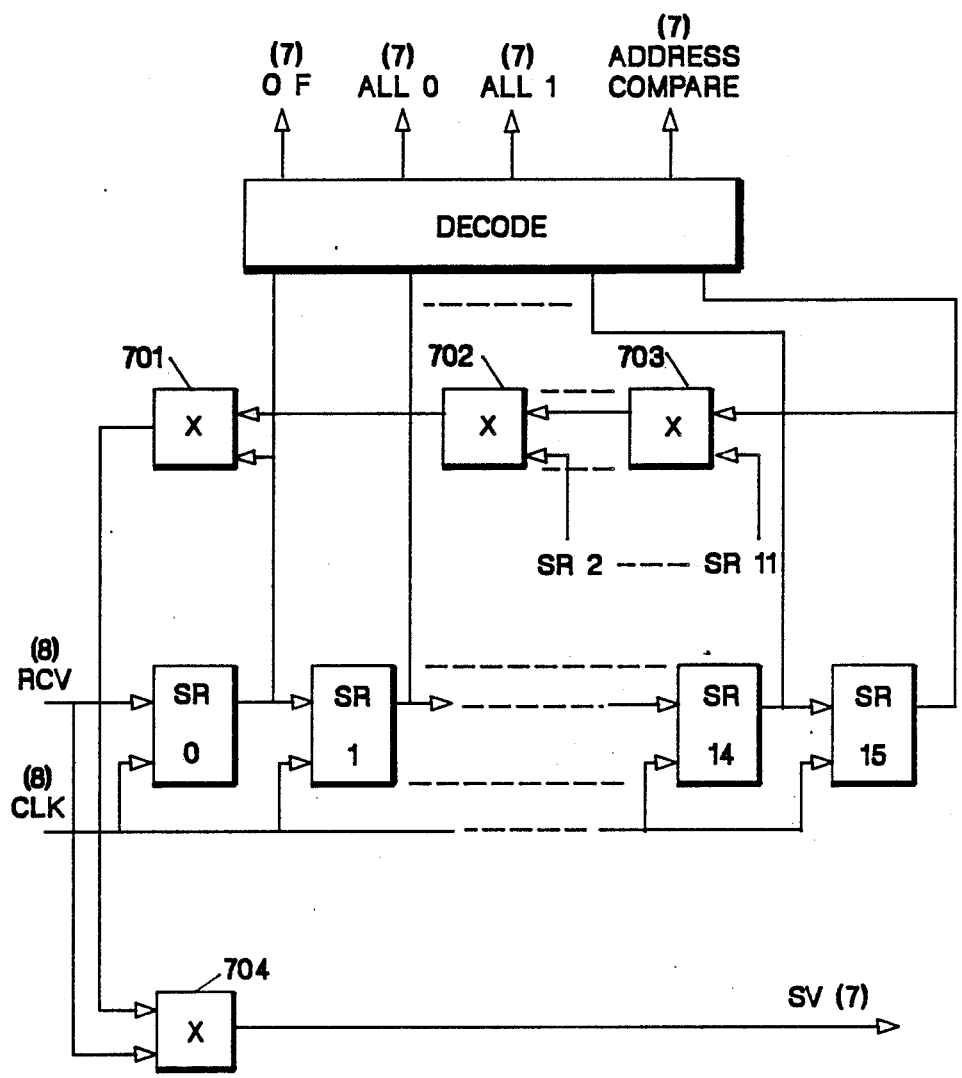
FIGS. 7-9 : are circuits made to implement the functions illustrated in FIG. 6.

Represented in FIG. 7 is the shift register 66. It includes a 16 stages shift register made of flip flops SR 0 through SR 15, provided with a predictor through XOR circuits X 701, X 702 and X 703, based on the polynomial used in the Communication Controller.

When operating in polling mode, the received bits RCV provided by the modem through receive logic switch 9, are fed through the shift register input. Shifting is controlled by clock signal CLK also provided by the circuit of FIG. 9. Another XOR circuit X 704 combines the outputs of X 701 and RCV to provide a Sequence Violation (SV) signal to the device of FIG. 8. A signal Sequence Violation (SV) is generated if an incoming bit violates the Poll Sequence. This is done to ensure a good protection against the possibility for a terminal to recognize its address in a garbled sequence of bits. The shift register can predict the next incoming bit of the poll sequence, and therefore identify any violation. Same device of FIG. 8 is also provided with decoded contents of the shift register of FIG. 7 providing data F 0, ALL 0, ALL 1 and Address compare (ADD COMP).

Figure 8:
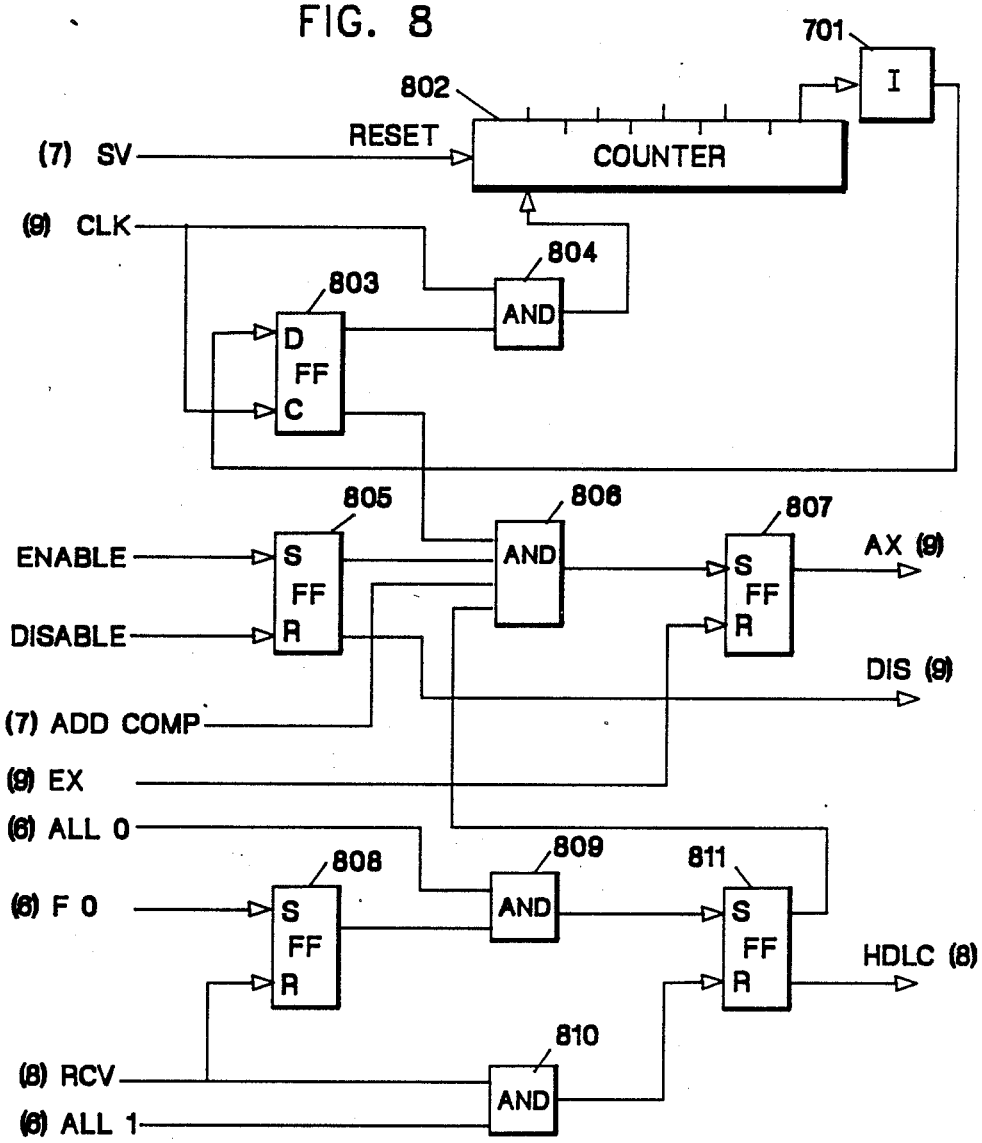
Figure 9:
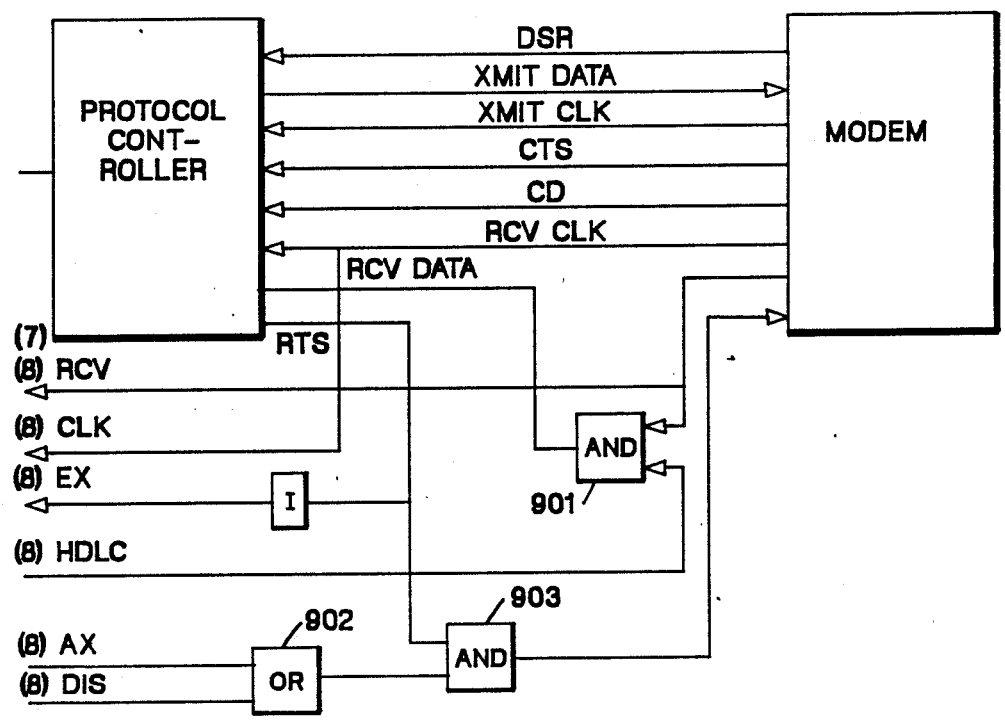

Represented in FIG. 8 is the timing control device of FIG. 6. It includes a 5 stage counter 802 reset by SV data from the device of FIG. 7. The counter 802 is clocked by CLK through one input of AND gate A 804, the second input of which is provided by a flip flop FF 803. Said flip flop FF 803 is clocked by CLK and fed by a data generated by the most significant digit, inverted through Inverter I 801.

The complementary output of FF 803 is ANDed into A 806 with normal output of a flip flop FF 805 set by ENABLE order and reset by DISABLE, both provided by the terminal microprocesser through its interface 65. The complementary output of FF 805 is used to provide Disabled (DIS) status to the device of FIG. 9. ADD COMP output from the device of FIG. 7 is used as third input to A 806. A fourth input to A 806 is provided by normal output of a flip flop FF 811 set and reset by outputs of AND gates A 809 and A 810 respectively. A 809 is made to AND ALL 0 data from device of FIG. 8, with output of a flip flop FF 808. The latter is set by OF and reset by RCV from devices of FIGS. 9 and 7 respectively. RCV and ALL 1 are used as inputs to AND gate A 810. A flip flop FF 807, set by the output of AND gate A 806 and reset by End of Transmission (EX) order from device of FIG. 9, is also used to provide an output Allow Transmission (AX) to the device of FIG. 9. The complementary output of FF 811 also provide HDLC indication to device of FIG. 9.

Represented in FIG. 9 is the receive logic enabling switching the modem 63 output from the protocol controller 64 to the polling device of this invention.

Again, interface functions between protocol controller 64 and modem 63 are made according to the CCITT recommendation V24/EIA Standard RS232 with the connecting lines identified as follows.

| DSR = | Data Set Ready |
| XMIT DATA = | Transmit Data |
| XMIT CLK = | Transmit clock |
| CTS = | Clear to Send |
| CD = | Carrier Detector |
| RCV CLk = | Receive Clock |
| RCV DATA = | Receive data |
| RTS = | Request to Send |

The transfer of RCV DATA from modem 63 to protocol controller 64 is gated through AND gate A 901 controlled by SDLC data from device of FIG. 8. The request to send RTS order provided by the terminal microprocessor through protocol controller 64 is gated through AND gate A 903 with ORed AX and DIS conditions through OR 0 902. Also, RTS is inverted to provide EX data.

In operation the shift register represented in FIG. 7 always receives the incoming bit stream RCV. The associated decoder DECODE detects the following data:

a flag followed by 8 zeros = F 0
a sequence of 16 zeros = ALL 0,
a sequence of 16 ones = ALL 1, a concidence between the contents of the shift register and the Terminal address.

The signals decoded are used in the Control Logic of FIG. 8 for performing the following functions:

detect the beginning of a Poll Sequence, in which case FF 811 is set by the decoding of a FLag which sets FF 808, and later on by the decoding of ALL 0, with no bit one received in the mean time;

detect the end of a Poll Sequence, in which case FF811 is reset by the detection of 16 ones in the shift register while a 17th one is received;

allow the terminal to transmit a response, by means of a signal Allow Transmission (AX) letting the RTS signal be applied to the modem interface through AND gate A 903. The modem will in turn raise CTS enabling the protocol controller to transmit the response without further delay. The occurrence of AX assumes several conditions to be met on input of AND gate A 806 which sets FF 807. These conditions are:

1) the control logic is enabled by the microprocessor, that is, FF 805 is set;

2) a coincidence between the shift register contents and the terminal address, i.e. ADD COMP =1;

3) a Poll Sequence is in progress, i.e. FF 811 is set; and, 4) no Sequence Violation has been detected among the last 16 bits received, FF 803 being set, implying Counter 802 has not been reset during the last 16 clock periods.

When the terminal has completed its transmission, it drops RTS, which causes FF 807 to be reset.

The above described Auto.poll technique may be used in a number of applications with slight specific adjustments for each application.

For instance, the process is of particular interest in environments where it is desirable to scan and get a definite response from all terminals attached to the network, to make sure said terminals are connected and running. This requirement can be encountered in remote monitoring systems where the disconnection of a device must be known without delay, into a short response if no new condition is to be reported. In such a case, some additional discipline has to be introduced in order to eliminate collisions in answers to polling. Assume up to 65534 devices could be connected to the network to be polled. Each device is made to answer after being polled by sending an SDLC frame including:

| Preamble | 2 bytes |
| Flag | 1 byte |
| Address | 2 bytes |
| Control | 1 byte |
| FCS | 2 bytes |
| Flag | 1 byte |
| Total | 9 bytes or 72 bits. (Maximum 80 bits with worst case zero insert). |

Groups of terminal addresses are defined such that the spacing between two subsequent addresses in the Auto-Poll sequence is 128 bits. 512, 128 bit long windows are defined in the Auto poll sequence. The Communication Controller attached to the network will send group broadcast messages to all 512 devices of a group inviting them to respond at the next Auto-poll sequence. Since polling is at bit rate (during pseudo-random autopoll sequence generation), then the time interval between two adjacently polled terminals will be 128 bit time long. This is obviously larger than the terminal answer which is at most 80 bit long, and enough margin is provided to allow variations in the propagation delays among the terminals belonging to a same group and the Communication Controller, to ensure operation without collision even if the terminals are spread throughout an urban area.

For this kind of operation, the system illustrated in the FIGS. 1 through 9 just described would apply as well. The only adjustment required may be brought by barring or setting OFF the Mode 1 data used in the device of FIG. 4. In this case, the Poll Sequence generation keeps progressing even when terminals are responding. These responses are now queued in the microprocessor storage, and Auto-Poll is stopped only by the microprocessor.

We claim:

1. A system for polling from a microprocessor controlled Communication Controller, N digital terminals made to communicate with said Controller via a high speed channel, said system including at the Controller site:

means sensitive to an order from said microprocessor for generating and broadcasting a specific pattern announcing subsequent polling operations;

a pseudo random generator sensitive to a subsequent order from said microprocessor for generating and broadcasting a first high rate equal to the bit rate, a random polling sequence of station addresses in which sequential station addresses are separated in time at the broadcasting rate by z bits of other station addresses where z is a whole number greater than or equal to 80.

sensing means within said microprocessor controlled Communication Controller for monitoring the message received back from the terminals;

inhibit means connected to said sensing means for subsequently broadcasting an inhibit message for inhibiting further message sending from the terminals upon a received message being detected by said sensing means;

validity checking means sensitive to said sensing means for checking the validity of said received message; and means sensitive to an invalidity being reported by said validity checking means for switching said polling to a second low rate polling means.

2. A polling system according to claim 1 wherein said second low rate polling means includes means for repeating at a lower rate the polling of a limited number of terminal addresses polled by the pseudo random generator just prior to the occurrence of an invalid check.

3. A polling process for polling from a central station N terminals made to communicate with said central station using digital frames including validity checking means, said process including steps of:

generating and transmitting from said central station, a first polling sequence of station addresses at a first high rate equal to the bit rate and having sequential station addresses separated in transmitting time from one another by at least z bits of other station addresses, where z is a whole number greater than or equal to 80;

monitoring at said central station the data received back from said terminals being polled;

checking for validity the received data at said central station; and, upon detecting invalid data received, repeating at said central station and transmitting at a second lower rate a polling sequence addressing a limited number of the terminals just polled prior to the invalid check;

and said method being characterized in that said first polling rate sequence is pseudo-randomly generated.

* * * * *